No. 815,928. PATENTED MAR. 20, 1906.
B. LEV.
CUSHIONING ROLLER FOR CAR FENDERS.
APPLICATION FILED JULY 18, 1904. RENEWED AUG. 18, 1905.
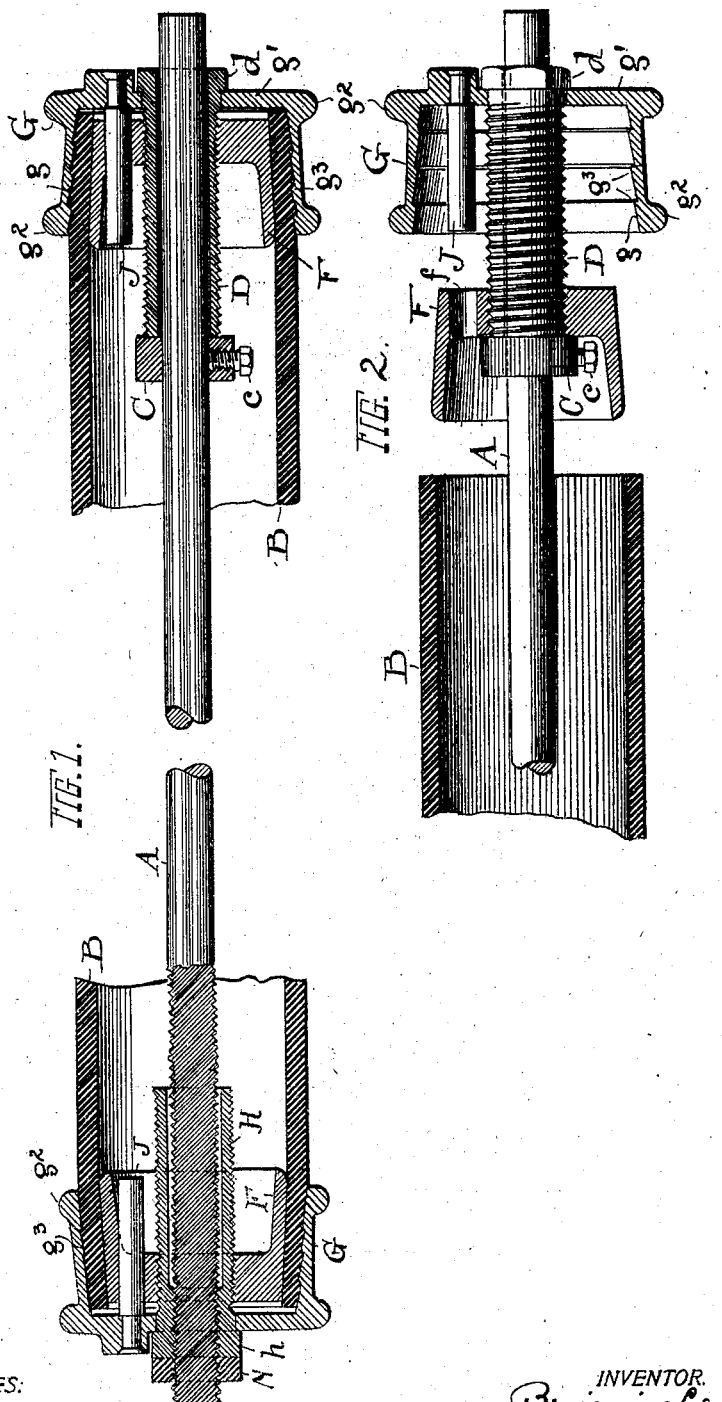
WITNESSES:
INVENTOR.
Benjamin Lev
BY H. J. Fisher
ATTORNEY.

UNITED STATES PATENT OFFICE.

BENJAMIN LEV, OF CLEVELAND, OHIO, ASSIGNOR TO ECLIPSE RAILWAY SUPPLY CO., OF KANSAS CITY, MISSOURI, A CORPORATION OF DELAWARE.

CUSHIONING-ROLLER FOR CAR-FENDERS.

No. 815,928.  Specification of Letters Patent.  Patented March 20, 1906.

Application filed July 18, 1904. Renewed August 18, 1905. Serial No. 274,812.

*To all whom it may concern:*

Be it known that I, BENJAMIN LEV, a citizen of the United States, residing at Cleveland, in the county of Cuyahoga and State of Ohio, have invented certain new and useful Improvements in Cushioning-Rollers for Car-Fenders; and I do declare that the following is a full, clear, and exact description of the invention, which will enable others skilled in the art to which it appertains to make and use the same.

My invention relates to a front cushioning-roller for car-fenders; and the invention consists in a roller constructed, arranged, and adapted to operate substantially as shown and described, and particularly pointed out in the claims.

In the accompanying drawings, Figure 1 is a longitudinal sectional elevation of a roller embodying my improvements with the middle portion broken out, and Fig. 2 is a vertical sectional elevation of the parts at one end of the roller in assembling position.

As thus shown, I provide a roller which is adapted to be put together and taken apart without destroying any of the parts and by any one who is not especially skilled in this art and in which the cushioning-tube of rubber may be conveniently replaced if injured, and the end bearings or roller-supports are such as to protect the rubber tubing from contact with the street.

To these several ends the invention comprises a central shaft A, threaded at one end and smooth at the other, and a preferably rubber cushioning-tube B of suitable quality and weight and locked at its ends and adapted to be stretched, as will now appear. Thus assuming that the device is to be assembled and the tube secured in place, as suggested in Fig. 2, I provide a collar C, which is secured by a set-screw $c$ upon the shaft A at a suitable distance from its end, and abutting against this collar is exterior-threaded sleeve D, which loosely encircles shaft A. The said sleeve has an octagonal or hexagonal or like head $d$, adapting it to be engaged by wrench, and about said sleeve D is a substantially cup-shaped collar F, which is contracted in its outer and smaller portion and threaded to engage on sleeve D, and in use it does so engage and serve as a substantially wedge-shaped annular member for locking the said tube B at its ends within and against the inner annular surface $g$ of the head G. The said head also is cup-shaped and contracted in its outer portion, with an inwardly-extending bottom or flange $g'$ all around engaged about its inner edge by head $d$ on sleeve D. Annular bearing ribs or beads $g^2$—one or more—are formed on heads G to take the possible surface contact when the roller for any reason runs on the surface of the street and which protects tube B. A pin J, fixed in head G, enters a hole in the bottom of collar F and prevents said collar from rotating except as head G is rotated also. It follows that when the end of tube B is inserted in head G its full depth, as in Fig. 1, and collar F is drawn up against it by turning sleeve D the said tube is firmly gripped and held between said collar and head. It will be seen also that there is something of a wedging effect between the collar F, with its tapered exterior, and the internal taper of head G, and the said head has annular ribs or projections $g^3$ on its inside which help to secure the tube and prevent its possible pulling out. At the other end the shaft A is externally threaded and engaged by a sleeve H, which is both internally and externally threaded—that is, its outer portion is externally threaded for engagement by collar F and its inner portion is internally threaded for engagement with shaft A—so that the sleeve H operates, essentially, as a nut on said shaft and can be turned by means of a wrench engaged upon its outer end, and thus effect the stretching of tube B as tightly as may be needed. Now assuming that the other end of the roller has been coupled up and the parts secured, as seen in Fig. 1, the sleeve H is rotated, and the shaft A rotates with it in the first place and until the collar F is drawn tight within head G at this end—the left relatively, as seen in Fig. 1—wherein the said collar has reached the limit of its movement and is firmly pressed against the inside of the rubber tube, and the said tube is locked in the grip of the head and collar. When this occurs, rotation of the said collar ceases, because it can go no farther, and then as sleeve H is further turned and shaft A held from rotation at the other end by some suitable means it causes a stretching pull upon the entire length of the tube B and stretches the tube as much as may be needed to make it firm at all points. Both the said heads G are so mounted that if there be independent rotation the tendency is to further stretch and tighten the tube B in place; but lock-nut N prevents this.

The foregoing construction provides a convenient knockdown roller which is easily repaired and is exceptionally safe and serviceable.

What I claim is—

1. A cushioning-roller for car-fenders, having substantially cup-shaped heads and tapered collars to engage within the roller-tube and lock the ends of the tube in said heads, substantially as described.

2. A cushioning-roller for car-fenders, comprising a central shaft and a flexible tube, heads inclosing the ends of the tube and tapered collars within the tube pressing the ends thereof against said heads, substantially as described.

3. In car-fenders, a cushioning-roller comprising a flexible tube, a substantially cup-shaped head at each end within which the ends of the tube are confined, tapered collars pressing the ends of the tube against said heads, and sleeves on said shaft having threaded engagement with said collars, substantially as described.

4. A cushioning-roller for car-fenders comprising a shaft and an externally-threaded sleeve on each end thereof, a tapered collar threaded on each of said sleeves and substantially cup-shaped heads at each end for confining the ends of the roller-tube and rotarily connected with said collars, substantially as described.

5. The central shaft and the externally-threaded sleeves thereon, one of said sleeves having threaded engagement with the shaft, and both sleeves provided with heads at their outer ends, confining-heads for the ends of the roller-tube, collars engaged on the threads of said sleeves and fixed rotarily to said heads, and the roller-tube locked between the interior of said heads and the exterior of said collars, the said shaft being provided with a fixed stop for the inner end of one of said sleeves, substantially as described.

In testimony whereof I sign this specification in the presence of two witnesses.

BENJAMIN LEV.

Witnesses:
R. B. MOSER,
C. A. SELL.